EDWARD A. ARCHIBALD.
Improvement in Metallic Hubs for Carriage Wheels.
No. 125,514.             Patented April 9, 1872.
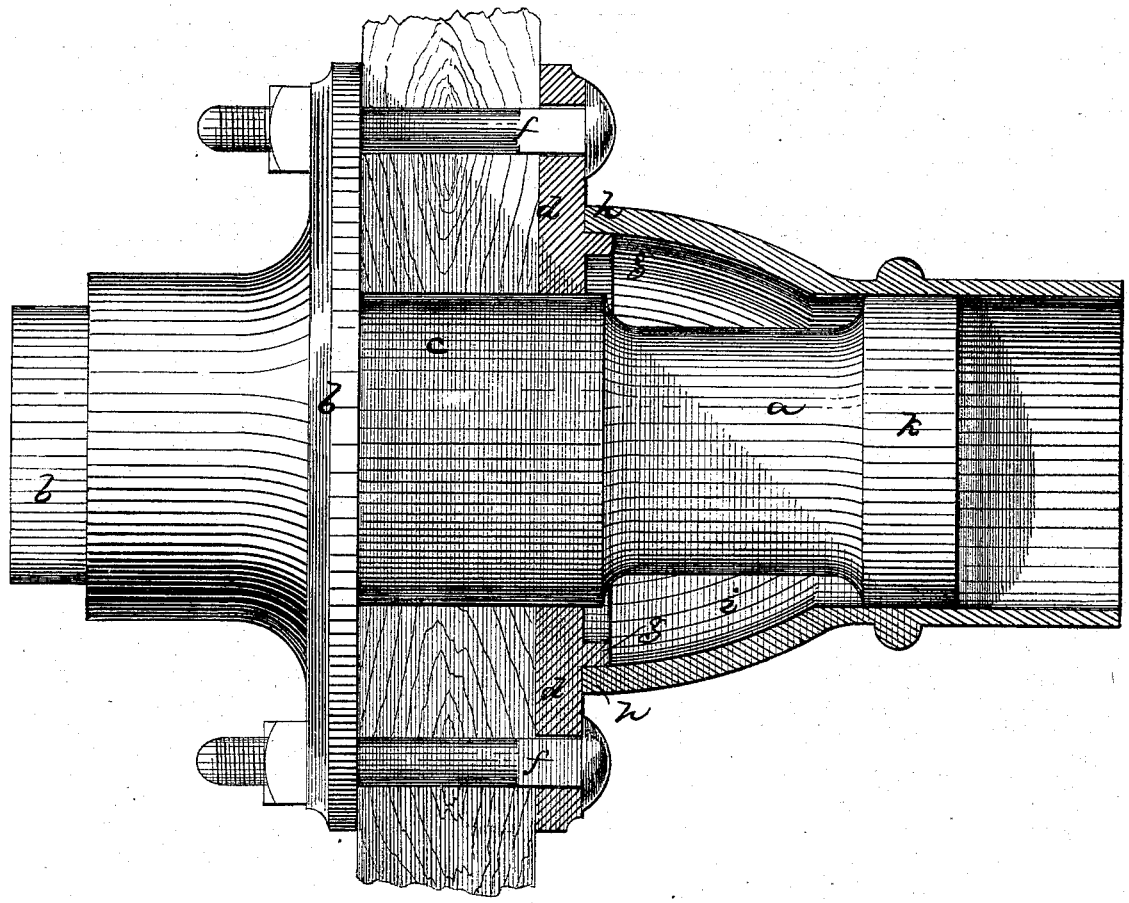
Witnesses.
M. W. Frothingham.
L. H. Latimer.
Edward A. Archibald.
By his Attys.
Crosby & Gould.

125,514

UNITED STATES PATENT OFFICE.

EDWARD A. ARCHIBALD, OF METHUEN, MASSACHUSETTS.

IMPROVEMENT IN METALLIC HUBS FOR CARRIAGE-WHEELS.

Specification forming part of Letters Patent No. 125,514, dated April 9, 1872.

*To all whom it may concern:*

Be it known that I, EDWARD A. ARCHIBALD, of Methuen, in the county of Essex and State of Massachusetts, have invented an Improved Metal Hub; and I do hereby declare that the following, taken in connection with the drawing which accompanies and forms part of this specification, is a description of my invention sufficient to enable those skilled in the art to practice it.

United States Letters Patent No. 120,845, dated November 14, 1871, were granted to me for an improvement in metal hubs for carriage-wheels. In the hub shown and described in said patent there are two spoke-embracing flanges on the metal pipe-box or axle-box, one of said flanges being an integral projection from the pipe, and the other being a removable collar, forming the flanged end of a screw-threaded sleeve, which screws over the axle-box (upon an external screw-thread thereon) and up and against the properly-assembled spoke-ends which encompass the box between the flanges. Screwing the flange up tightly enough against the spokes to firmly hold them sometimes exerts an undue strain upon the screw-threads, and upon the flanges, and the flanges spread.

In my present invention I make the removable collar as an independent ring, which ring I drive upon the axle-box and against the spokes, and connect to the other flange by a series of screw-bolts or rivets; and upon the outer side of the removable ring or flange I cast or form a circular lip or shoulder, which is encircled by the inner end of the box-encircling sleeve, said sleeve being made independent of both the flange and the box, or as a separate piece, its inner end encircling and resting upon the flange-lip, and its outer end fitting to and against the enlarged portion of the box.

It is in this construction that my present invention consists; or in a metal hub in which the fixed flange and movable flange that embrace and hold the spoke-ends, being connected and held together by a series of bolts or rivets, a separate box-strengthening, encompassing, and shaping sleeve is used, the inner end of the sleeve encircling and resting upon the circular flange-lip, and its outer end fitting around the box, said sleeve being united to the flange and box by screw-threads or by shrinking upon the outer end of the box, the inner end being either shrunk upon or simply fitting around the lip.

The drawing shows a metal hub embodying the invention.

*a* denotes the pipe or axle box; *b*, the flange, forming an integral part thereof. *c* denotes the portion of the box around which the inner ends of the spokes are assembled; *d*, the movable collar or flange, between which and the flange *b* the spoke-ends are confined, each flange being provided with holes, through which the bolts or rivets *f* pass to firmly unite the flanges and bind them against the spokes. On the outer face of the collar *d* is the circular lip or shoulder *g*, over which fits the end *h* of the box-encompassing sleeve *i*. This sleeve may be formed as shown in the drawing, or may have any other suitable shape, one end fitting upon the end *k* of the box and the other end upon the lip *g*, the connection of the sleeve with the flange or collar and with the box being effected by heating the sleeve and shrinking its outer end upon the enlarged portion of the box, (and its inner end upon the lip, if desirable;) or by nut-threading the outer end of the sleeve and screw-threading the corresponding portion of the box and screwing the sleeve upon the box, the lip *g* and outer end of the sleeve being also screw and nut threaded, if desirable. In practice I prefer to shrink the sleeve upon the box.

By these means the hub is very inexpensively made, and can be readily applied without injury to itself or to the spokes.

The inner end of the hub may be formed with a surface, *l*, upon which may be placed a ring, covering the end of the hub and the shoulder upon the axle.

The outer side of the flange *b* may be formed with a lip similar to the lip *g*, and a sleeve similar to the sleeve *i* may be applied to and set thereupon. I prefer, however, for most carriages, a hub formed as shown.

I claim—

The metal hub, having its flange $b$ and collar $d$ formed to be connected by rivets or bolts, and having also a hub-encircling, bracing, and shaping sleeve, $i$, the inner end of which encircles and rests upon the circular lip $g$, while its outer end fits to and around the enlarged portion of the box, to which it is joined by shrinking it thereupon or by a screw-thread connection, all substantially as shown and described.

E. A. ARCHIBALD.

Witnesses:
 JOHN LAW,
 R. L. PAGE.